United States Patent
Lee et al.

(10) Patent No.: US 10,333,609 B2
(45) Date of Patent: Jun. 25, 2019

(54) METHOD OF GENERATING TRANSMISSION SIGNAL USING PREPROCESSING FILTER OF MIMO TRANSMITTER

(71) Applicant: LG ELECTRONICS INC., Seoul (KR)

(72) Inventors: Kilbom Lee, Seoul (KR); Jiwon Kang, Seoul (KR); Kitae Kim, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 29 days.

(21) Appl. No.: 15/304,014

(22) PCT Filed: Feb. 13, 2015

(86) PCT No.: PCT/KR2015/001498
§ 371 (c)(1),
(2) Date: Oct. 13, 2016

(87) PCT Pub. No.: WO2015/167117
PCT Pub. Date: Nov. 5, 2015

(65) Prior Publication Data
US 2017/0041049 A1    Feb. 9, 2017

Related U.S. Application Data

(60) Provisional application No. 61/984,853, filed on Apr. 27, 2014.

(51) Int. Cl.
*H04B 7/08*    (2006.01)
*H04L 5/00*    (2006.01)
(Continued)

(52) U.S. Cl.
CPC ......... *H04B 7/0845* (2013.01); *H04B 7/0417* (2013.01); *H04B 7/0456* (2013.01);
(Continued)

(58) Field of Classification Search
None
See application file for complete search history.

(56) References Cited

U.S. PATENT DOCUMENTS

2011/0310831 A1    12/2011 Bhattad et al.
2012/0069769 A1    3/2012 Lain et al.
(Continued)

FOREIGN PATENT DOCUMENTS

CN    102014503 A    4/2011
CN    106134096 A    11/2016
(Continued)

OTHER PUBLICATIONS

Lee et al., "MMSE-Based CFO Compensation for Uplink OFDMA Systems with Conjugate Gradient," IEEE Transactions on Wireless Communications, vol. 11, No. 8, XP011457433, Aug. 2012, pp. 2767-2775.
(Continued)

*Primary Examiner* — Joseph A Bednash
(74) *Attorney, Agent, or Firm* — Birch, Stewart, Kolasch & Birch, LLP

(57) ABSTRACT

A method of generating a transmission signal and a MIMO transmitter are disclosed. The method includes the steps of selecting a reference RE from an RE group including a plurality of resource elements (REs), generating a common precoder and a preprocessing filter to be shared by the plurality of the REs belonging to the RE group based on channel information of the reference RE, generating first signals corresponding to a precoding signal for each of the plurality of the REs in a manner of applying the common (Continued)

precoder to transmission data of each of the plurality of the REs and generating second signals in a manner of compensating first signals of REs except the reference RE among the plurality of the REs using channel information of each of plurality of the REs and the preprocessing filter.

18 Claims, 10 Drawing Sheets

(51) Int. Cl.
    *H04J 11/00*         (2006.01)
    *H04B 7/0417*      (2017.01)
    *H04B 7/0456*      (2017.01)

(52) U.S. Cl.
    CPC ......... *H04J 11/005* (2013.01); *H04J 11/0033* (2013.01); *H04L 5/003* (2013.01); *H04L 5/0023* (2013.01); *H04L 5/0073* (2013.01)

(56) References Cited

U.S. PATENT DOCUMENTS

| | | |
|---|---|---|
| 2012/0114058 A1 | 5/2012 | Gan et al. |
| 2012/0129457 A1 | 5/2012 | Linsky |
| 2012/0182931 A1 | 7/2012 | Shen et al. |
| 2013/0051505 A1 | 2/2013 | Singh et al. |
| 2013/0242773 A1* | 9/2013 | Wernersson ........... H04B 7/024 370/252 |
| 2013/0294547 A1 | 11/2013 | Lane et al. |
| 2014/0050187 A1 | 2/2014 | Nakshima et al. |
| 2014/0064354 A1* | 3/2014 | Nakano ............. H04L 25/03955 375/233 |
| 2015/0092583 A1 | 4/2015 | Balraj et al. |
| 2015/0326364 A1 | 11/2015 | Koivisto et al. |

FOREIGN PATENT DOCUMENTS

| | | |
|---|---|---|
| EP | 2 680 517 A1 | 1/2014 |
| JP | 2010-93487 A | 4/2010 |
| KR | 10-2010-0117344 A | 11/2010 |
| KR | 10-2012-0004561 A | 1/2012 |
| KR | 10-2013-0079582 A | 7/2013 |
| WO | WO 2013/155908 A1 | 10/2013 |
| WO | WO 2014/054219 A1 | 4/2014 |
| WO | WO 2015/137603 A1 | 9/2015 |
| WO | WO 2015/167117 A1 | 11/2015 |

OTHER PUBLICATIONS

Tong et al., "Linear Precoding for MIMO Systems with Low-Complexity Receivers," IEEE Transactions on Wireless Communications, vol. 11, No. 8, XP011457457, Aug. 2012, pp. 2828-2837.

* cited by examiner time domain (Doppler)

frequency domain (channel delay profile)

METHOD OF GENERATING TRANSMISSION SIGNAL USING PREPROCESSING FILTER OF MIMO TRANSMITTER

CROSS REFERENCE TO RELATED APPLICATIONS

This application is the National Phase of PCT International Application No. PCT/KR2015/001498, filed on Feb. 13, 2015, which claims priority under 35 U.S.C. 119(e) to U.S. Provisional Application No. 61/984,853, filed on Apr. 27, 2014, all of which are hereby expressly incorporated by reference into the present application.

TECHNICAL FIELD

The present invention relates to a method of reducing implementation complexity and memory demand while performance degradation of a transmitter is minimized in massive MIMO environment.

BACKGROUND ART

A MIMO (multiple input multiple output) system corresponds to a wireless communication system using multiple transmission antennas and multiple reception antennas. The MIMO system minimizes a fading impact occurring on a radio channel using a diversity scheme and can enhance throughput by simultaneously transmitting a plurality of streams using spatial multiplexing. In case of the SM (spatial multiplexing) scheme, when the number of transmission antennas corresponds to $N_t$ and the number of reception antennas corresponds to $N_r$, the maximum number of transmittable streams corresponds to min ($N_t$, $N_r$). In particular, it is already known that inclination of communication capacity is shown as min ($N_t$, $N_r$) in high SNR. Since the communication capacity corresponds to maximum throughput capable of being logically transmitted on a given channel, if the number of transmission antennas and the number of reception antennas are increasing at the same time, the communication capacity is also increasing.

A massive MIMO system including the huge number of transmission and reception antennas is receiving attention as one of technologies constructing 5G. Many theses and experiments assume the MIMO system as a single base station (including a distributed antenna system) equipped with a plurality of antennas and a plurality of user equipments equipped with a single antenna. In this case, although a user equipment is equipped with a single antenna, since a plurality of the user equipments are receiving a service from a single base station at the same time, a channel between the base station and all of a plurality of the user equipments can be comprehended as MIMO. If the number of all user equipments is defined as K, the aforementioned inclination of the communication capacity in the high SNR can be represented by min ($N_t$, K).

Meanwhile, when a base station including the logically infinite number of transmission antennas transmits data to a plurality of user equipments, an optimal transmission algorithm of the base station corresponds to an MRT (maximal ratio transmission) algorithm. Meanwhile, when a base station receives data transmitted to the base station by a plurality of user equipments, an optimal reception algorithm of the base station corresponds to an MRC (maximal ratio combining) algorithm. Since the MRT and the MRC do not consider interference, performance degradation may occur when the base station is equipped with the finite number of antennas. Yet, if the base station is equipped with the infinite number of antennas, since the interference is gone, the MRT and the MRC may become an optimal solution.

Since a base station can make a beam to be thin (sharp) via antenna beamforming, the base station can concentrate energy on a specific user equipment. By doing so, identical information can be delivered using smaller power. On the contrary, since the aforementioned method does not interfere neighboring different user equipments, it may become a method capable of minimizing performance degradation of a system due to interference.

Technical Task

The present invention is devised to solve the aforementioned general technical problem. One object of the present invention is to minimize transmission signal generation complexity while performance of a transmitter is maintained in massive MIMO environment.

Another object of the present invention is to actively control transmission signal generation complexity by controlling a target performance of a transmitter according to communication environment.

The other object of the present invention is to enhance a speed of generating a transmission signal and enable a signal processing to be efficiently performed by making a MIMO transmitter utilize a preprocessing filter.

Technical tasks obtainable from the present invention are non-limited the above mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of generating a transmission signal, which is generated by a MIMO (multiple input multiple output) transmitter including a plurality of antennas, includes the steps of selecting a reference RE from an RE group including a plurality of resource elements (REs), generating a common precoder and a preprocessing filter to be shared by the plurality of the REs belonging to the RE group based on channel information of the reference RE, generating first signals corresponding to a precoding signal for each of the plurality of the REs in a manner of applying the common precoder to transmission data of each of the plurality of the REs, and generating second signals in a manner of compensating first signals of REs except the reference RE among the plurality of the REs using channel information of each of the plurality of the REs and the preprocessing filter.

The preprocessing filter may correspond to a matrix used for enhancing accuracy of a process of generating the second signals by compensating the first signals.

The preprocessing filter can be generated using a Jacobi algorithm, a Gauss-Siedel algorithm, an SQR preconditioning algorithm, or an incomplete Cholesky factorization algorithm based on the channel information of the reference RE.

The preprocessing filter can be generated in a manner that a diagonal matrix is generated by approximating the channel information of the reference RE and a Jacobi algorithm is applied to the diagonal matrix.

The second signals can be generated by applying the preprocessing filter and a CG (conjugate gradient) algorithm, a Newton method algorithm, or a steepest descent method algorithm together with the channel information of each RE to the first signals.

The second signals can be generated by repeatedly performing the compensation process until an error between a result calculated using the channel information of each REs and the first signal becomes less than a threshold value instead of the common precoder and the maximum number of repeatedly performed compensation process can be determined according to MIMO channel environment or a user input.

The method can further include the step of generating third signals corresponding to transmission signals in a manner of converting a first signal of the reference RE and second signals of the REs except the reference RE among the plurality of the REs.

The third signals are generated based on a function $f(t_n, H_n) = H_n^\dagger t_n$ (n=1, 2, ..., N) to which channel information of each of the plurality of the REs is reflected, $t_n$ of the function corresponds to the first signal (n=1) of the reference RE or the second signals (n=2, 3, ..., N) of the REs except the reference RE and N may indicate the number of REs belonging to the RE group.

The common precoder may correspond to a part of a ZF (zero forcing) precoding matrix, a regularized ZF precoding matrix, or an MMSE (minimum mean square error) precoding matrix.

To further achieve these and other advantages and in accordance with the purpose of the present invention, as embodied and broadly described, according to a different embodiment, a method of generating a transmission signal, which is generated by a MIMO (multiple input multiple output) transmitter including a plurality of antennas, includes the steps of selecting a reference RE from an RE group including a plurality of resource elements (REs), generating a common precoder to be shared by the plurality of the REs belonging to the RE group based on channel information of the reference RE, generating first signals corresponding to a precoding signal for each of the plurality of the REs in a manner of applying the common precoder to transmission data of each of the plurality of the REs, generating preprocessing filters to be applied to each of REs except the reference RE based on channel information of the REs except the reference RE among the plurality of the REs, and generating second signals in a manner of compensating first signals of the REs except the reference RE using the preprocessing filter and channel information of each of the plurality of the REs.

To achieve these and other advantages and in accordance with the purpose of the present invention, as embodied and broadly described, according to one embodiment, a MIMO (multiple input multiple output) transmitter including a plurality of antennas and generating a transmission signal to be transmitted by a plurality of the antennas includes a transmission unit, a reception unit, and a processor configured to generate the transmission signal in a manner of being connected with the transmission unit and the reception unit, the processor configured to select a reference RE from an RE group including a plurality of resource elements (REs), the processor configured to generate a common precoder and a preprocessing filter to be shared by the plurality of the REs belonging to the RE group based on channel information of the reference RE, the processor configured to generate first signals corresponding to a precoding signal for each of the plurality of the REs in a manner of applying the common precoder to transmission data of each of the plurality of the REs, the processor configured to generate second signals in a manner of compensating first signals of REs except the reference RE among the plurality of the REs using channel information of each of the plurality of the REs and the preprocessing filter.

To further achieve these and other advantages and in accordance with the purpose of the present invention, as embodied and broadly described, according to a different embodiment, a MIMO (multiple input multiple output) transmitter including a plurality of antennas and generating a transmission signal to be transmitted by a plurality of the antennas includes a transmission unit, a reception unit, and a processor configured to generate the transmission signal in a manner of being connected with the transmission unit and the reception unit, the processor configured to select a reference RE from an RE group including a plurality of resource elements (REs), the processor configured to generate a common precoder to be shared by the plurality of the REs belonging to the RE group based on channel information of the reference RE, the processor configured to generate first signals corresponding to a precoding signal for each of the plurality of the REs in a manner of applying the common precoder to transmission data of each of the plurality of the REs, the processor configured to generate preprocessing filters to be applied to each of REs except the reference RE based on channel information of the REs except the reference RE among the plurality of the REs, the processor configured to generate second signals in a manner of compensating first signals of the REs except the reference RE using the preprocessing filter and channel information of each of the plurality of the REs.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, as a correlation between REs is getting bigger, signal generation complexity of a transmitter becomes reduced. Although the correlation is small, complexity can be reduced without a loss of performance.

Secondly, since transmission signal generation complexity can be controlled as necessary, performance control can be adaptively performed according to communication environment.

Thirdly, it is able to promptly and precisely process a transmission signal in a manner that a transmitter utilizes a preprocessing filter compared to a case that the transmitter does not utilize the preprocessing filter.

Effects obtainable from the present invention may be non-limited by the above mentioned effect. And, other unmentioned effects can be clearly derived and understood from the following description by those having ordinary skill in the technical field to which the present invention pertains. Moreover, the present invention may have an unexpected advantage while those skilled in the art implement the present invention based on the following description.

DESCRIPTION OF DRAWINGS

The accompanying drawings, which are included to provide a further understanding of the invention, provide embodiments of the present invention together with detailed explanation. A technical characteristic of the present invention may be non-limited by a specific drawing. A new embodiment can be configured by combining characteristics disclosed in each drawing with each other. Reference numerals in each drawing mean structural elements.

MODE FOR INVENTION

[Best Mode for Invention]

Figure 1:
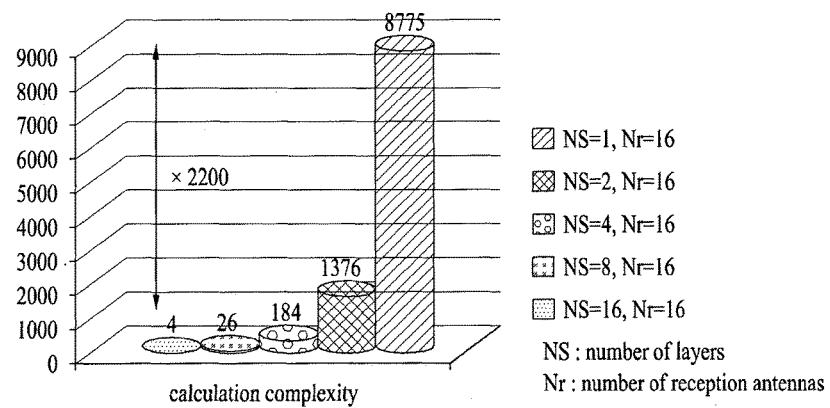
FIG. 1 is a diagram for calculation complexity according to the number of received streams in MIMO (multiple input multiple output) environment in accordance with the present invention.
Figure 2:
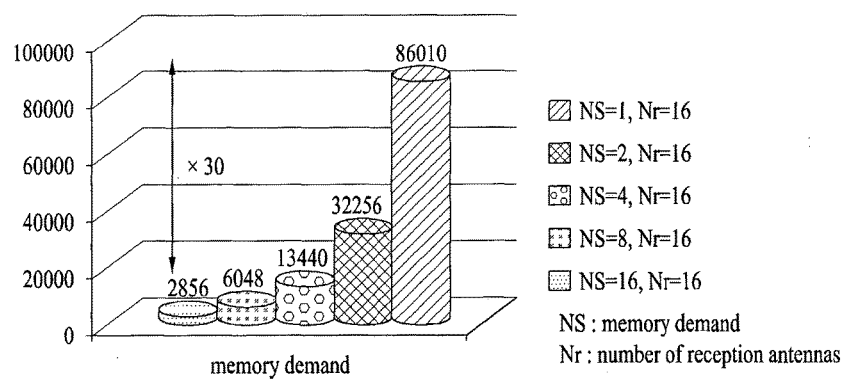
FIG. 2 is a diagram for a memory demand according to the number of received streams in MIMO environment in accordance with the present invention.
Figure 3:
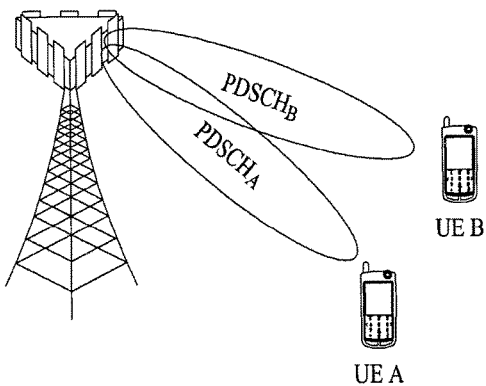
FIG. 3 is a diagram for interference between user equipments within an identical cell in MIMO environment in accordance with the present invention.
Figure 4:
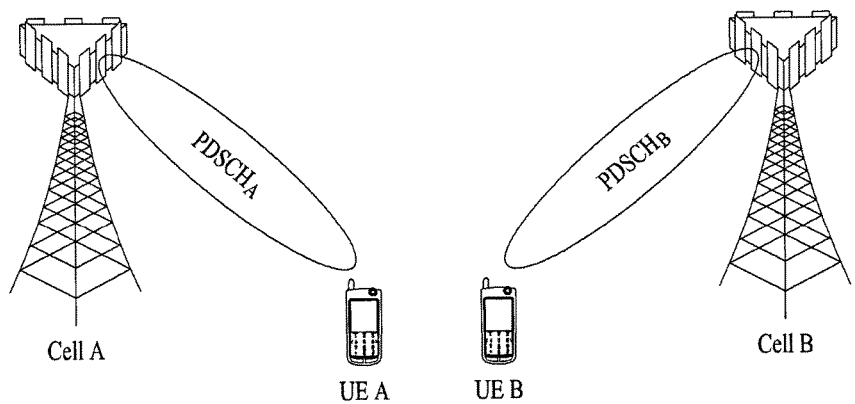
FIG. 4 is a diagram for interference between neighboring cells in MIMO environment in accordance with the present invention.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

Procedures or steps probably making the point of the present invention unclear are skipped and procedures or steps understandable by those skilled in the art are also skipped as well.

In the present application, such a terminology as 'comprise', 'include' or the like should be construed not as excluding a different component but as further including the different component unless there is a special citation. And, in the present specification, such a terminology as ' . . . unit', ' . . . device', 'module' or the like means a unit for processing at least one function or an operation and can be implemented by a hardware, a software, or a combination thereof. Moreover, "a or an", "one", "the" or a similar related word can be used as a meaning including both a singular number and a plural number in the following contexts (in particular, in the following contexts of the claims) unless it is clearly contradicted to a context of the present invention.

In the present specification, the embodiments of the present invention are explained in a manner of mainly concerning data transmission and reception between a base station and a mobile station. In this case, the base station has a meaning of a terminal node of a network performing a direct communication with the mobile station. In the present disclosure, a specific operation, which is explained as performed by the base station, may be performed by an upper node of the base station in some cases.

In particular, in a network constructed with a plurality of network nodes including a base station, it is apparent that various operations performed for communication with a mobile station can be performed by the base station or other networks except the base station. 'Base station (BS)' may be substituted with such a terminology as a fixed station, a Node B, an eNode B (eNB), an advanced base station (ABS), an access point (AP) and the like.

And, a mobile station (MS) may be substituted with such a terminology as a user equipment (UE), a subscriber station (SS), a mobile station subscriber station (MSS), a mobile terminal (MT), an advanced mobile station (AMS), a terminal, and the like.

And, a transmitting end corresponds to a fixed and/or mobile node providing a data service or an audio service and a receiving end corresponds to a fixed and/or mobile node receiving the data service or the audio service. Hence, a mobile station becomes the transmitting end and a base station may become the receiving end in uplink. In the same manner, the mobile station becomes the receiving end and the base station may become the transmitting end in downlink.

And, when a device performs communication with a 'cell', it may indicate that the device transceives a signal with a base station of the cell. In particular, although the device actually transmits and receives a signal with a specific base station, for clarity, it may be represented as the device transmits and receives a signal with a cell formed by the specific base station. Similarly, a 'macro cell' and/or 'small cell' may indicate a specific coverage, respectively. Moreover, the 'macro cell' and/or the 'small cell' may indicate a 'macro base station supporting the macro cell' and a 'small cell base station supporting the small cell', respectively.

The embodiments of the present invention can be supported by standard documents disclosed in at least one of IEEE 802.xx system, 3GPP system, 3GPP LTE system and 3GPP2 system. In particular, unmentioned clear steps or parts of the embodiments of the present invention can be explained with reference to the aforementioned standard documents And, all terminologies disclosed in the present specification can be explained by the aforementioned standard document. In particular, embodiments of the present invention can be supported by at least one of a standard document of IEEE 802.16 including P802.16e-2004, P802.16e-2005, P802.16.1, P802.16p, and P802.16.1b.

In the following, preferred embodiment according to the present invention is explained in detail with reference to attached drawings. Detailed description disclosed together with the accompanying drawings is intended to explain not a unique embodiment of the present invention but an exemplary embodiment of the present invention.

Moreover, specific terminologies used in the embodiments of the present invention are provided to help understanding of the present invention and the use of the specific terminologies can be modified in a different form in a scope without departing from the technical idea of the present invention.

1. Massive MIMO System

A heterogeneous cellular network (HetNet) is defined by a macro cell and a plurality of small cells. A macro cell base station plays a role in supporting user equipments located at a range incapable of being covered by a small cell. Hence, it is necessary for the macro cell base station to provide a service to a plurality of user equipments at the same time.

Theoretically, a base station can provide a service to user equipments as many as the number of antennas of the base station under a condition that the user equipments receive a single stream. Hence, assume that the macro cell base station corresponds to a massive MIMO base station including many (M number) antennas. In this case, when a base station supports K number of user equipments at the same time, the number of antennas corresponds to K in terms of the base station and channels between the base station and the user equipments can be represented as 'M*K' matrix.

Meanwhile, a base station selects a precoding scheme to provide a service to user equipments. A representative precoding scheme may include an MRT (maximum ratio transmission) scheme and a ZF (zero forcing) scheme. In case of the MRT scheme, although complexity of the MRT scheme is low, since the MRT scheme causes interference to a user equipment, performance of a receiving end is reduced. On the contrary, in case of the ZF scheme, although the ZF scheme does not cause interference to a user equipment, complexity of the ZF scheme is rapidly increasing as the number of antennas increases. If the number of antennas increases toward infinity, it is identified that interference-inducing, which is a weak point of the MRT scheme, is disappeared and the MRT scheme shows performance identical to performance of the ZF scheme. Yet, if the number of antennas is finite, the ZF scheme always shows performance better than that of the MRT scheme. Hence, it is necessary to have a new transmitter precoding scheme operating with less complexity and performance similar to that of the legacy ZF scheme in massive MIMO environment.

Figure 6:
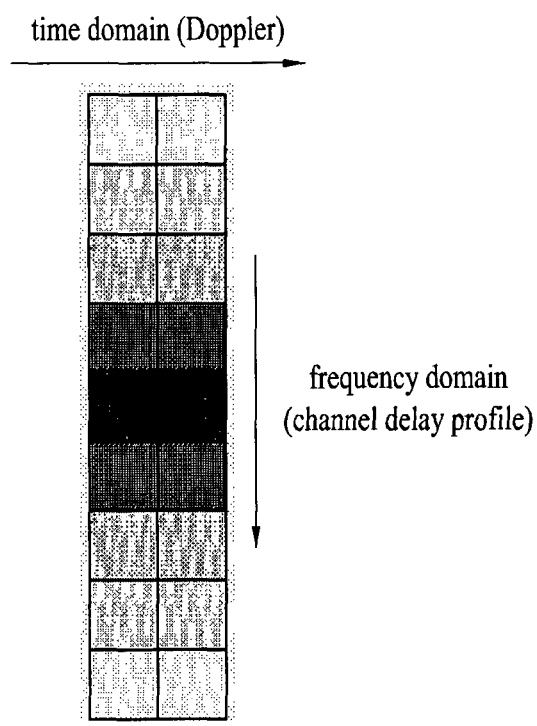
FIG. 6 is a diagram for an RE group formed by a plurality of resource elements in accordance with the present invention.
Figure 7:
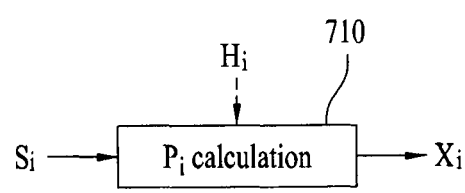
FIG. 7 is a flowchart for an operating process of a legacy MIMO transmitter in accordance with the present invention.

In the following, an operation algorithm of a legacy MIMO transmitter is explained with reference to the aforementioned problems. FIG. 6 is a diagram for an RE group formed by a plurality of resource elements in accordance with the present invention. FIG. 7 is a flowchart for an operating process of a legacy MIMO transmitter in accordance with the present invention.

Figure 5:
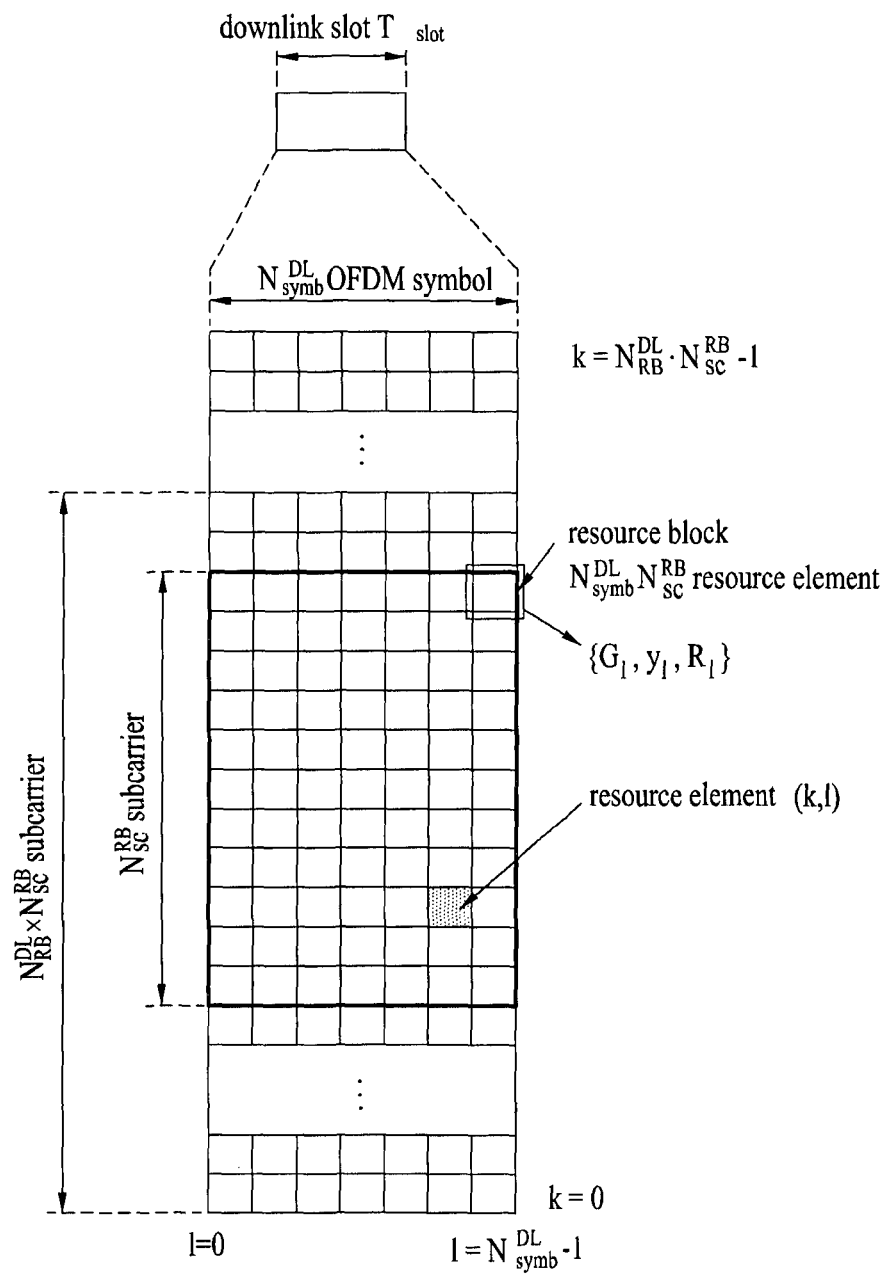
FIG. 5 is a diagram for a structure of a resource block (RB) allocated to a user equipment in accordance with the present invention.

FIG. 6 shows a part of an RB depicted in FIG. 5 and an RE group consisting of a plurality of REs. In FIG. 6, a vertical axis and a horizontal axis indicate a frequency axis and a time axis, respectively. Channels of REs belonging to the RE group may have correlation with each other. As shade of each RE is getting dark, correlation with a center RE is bigger. On the contrary, as shade of each RE is getting brighter, the correlation with the center RE is smaller.

As shown in FIG. 7, a legacy MIMO transmitter calculates and generates a precoder in every RE without considering the correlation between REs [S710]. In particular, when a MIMO channel of an $1_{th}$ RE is defined as $H_l$, a transmission data $S_l$ of each RE is transmitted by being passing through a precoding process as shown in Formula 1 in the following.

$$x_l = \tilde{P}_l s_l \qquad \text{[Formula 1]}$$

In case of the MRT scheme, a precoding matrix $\tilde{P}_l$ can be represented as $\tilde{P}_l = H_l^\dagger$ in Formula 10. On the contrary, in case of the regularized ZF scheme, the $\tilde{P}_l$ can be represented as $\tilde{P}_l = H_l^\dagger (H_l H_l^\dagger + \Gamma_1)^{-1}$ and $\Gamma_l$ becomes a regularized term. If the $\Gamma_1$ corresponds to 0, a precoding matrix according to the regularized ZF scheme becomes a normal ZF precoding matrix. Meanwhile, in case of using the regularized ZF scheme, calculation complexity used for calculating a precoding matrix can be represented as Formula 2 in the following.

$$\left(\frac{1}{2}N_t N_s^2 + \frac{1}{2}N_s^3 + N_s^2 + N_t N_s\right) N_{RB}^{DL} N_{symb}^{DL} \qquad \text{[Formula 2]}$$

In case of a MIMO transmitter, streams ($N_s = N_t$) as many as the maximum number of transmission antennas can be transmitted to a plurality of user equipments. Hence, system throughput linearly increases in proportion to the number of antennas but the complexity rapidly increases in proportion to the cube ($O(N_s^3)$) of the stream number. Hence, when the number of transmission stream is big, the aforementioned precoding scheme may have a problem of complexity.

In the following, a MIMO transmitter, which operates according to an algorithm including less complexity and providing performance identical to performance of the legacy algorithm using the aforementioned correlation between REs belonging to an RE group, is proposed.

2. Operation Algorithm of Proposed MIMO Transmitter

Figure 8:
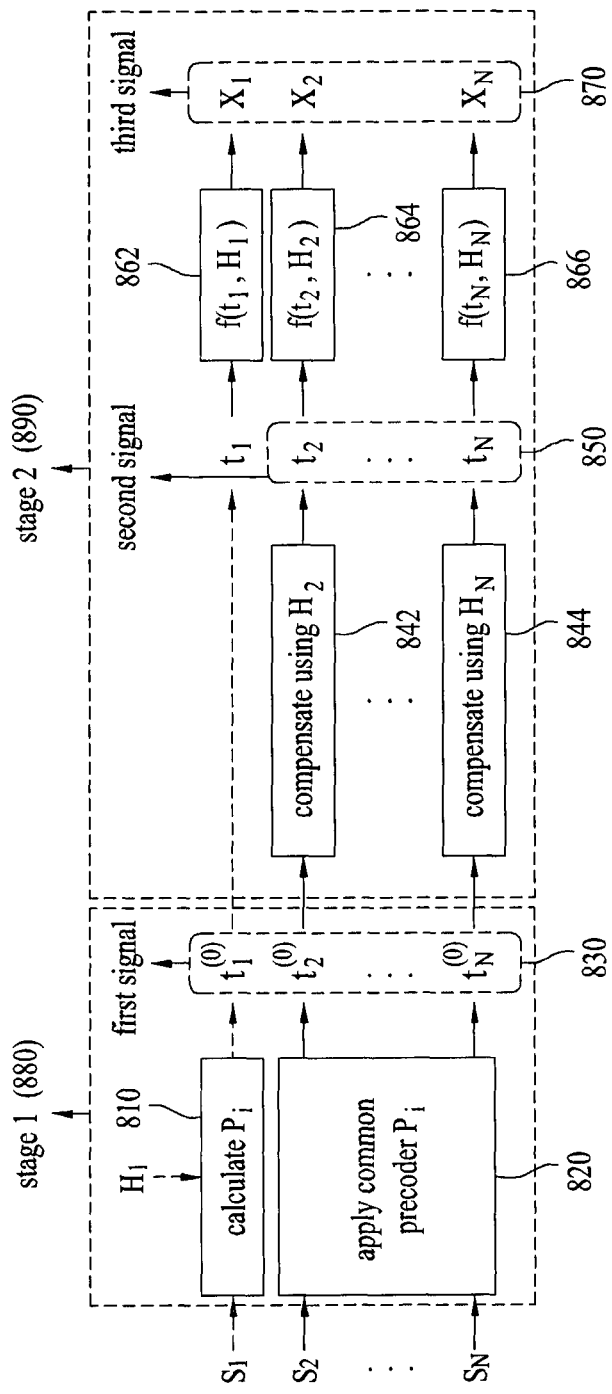
FIG. 8 is a flowchart for an operating process of a MIMO transmitter according to one embodiment of the present invention.

In the following, an operation algorithm of a MIMO transmitter operating with less complexity and maintaining similar performance is proposed with reference to FIG. 8. FIG. 8 is a flowchart for an operating process of a MIMO transmitter according to one embodiment of the present invention. In FIG. 8, an embodiment of selecting a reference RE from an RE group and sharing a transmission filter (i.e., a precoding matrix or a precoder), which is determined based on a channel of the selected reference RE, in the RE group is explained.

The proposed transmitter operation algorithm is mainly divided into a stage 1 [S880] and a stage 2 [S890]. A process of generating a first signal by utilizing a common precoder is performed in the stage 1 [S880]. In the stage 2 [S890], a final transmission signal is generated by passing through a compensation process for the first signal. In the following, each stage is explained in detail.

First of all, in FIG. 8, $P_1$ indicates a precoder generated based on a MIMO channel of a reference RE [S810] and a signal $t_l^{(0)}$ generated by an $l_{th}$ RE belonging to an RE group using the $P_1$ as a common precoder [S820] is defined as a first signal [S830]. Meanwhile, the reference RE corresponds to an RE selected from the RE group according to a random criterion. The reference RE can be determined irrespective of an order or a position in the RE group. The reference RE may correspond to an RE of which correlation between the reference RE and different REs is biggest in the RE group.

Meanwhile, the first signals become a second signal $t_l$ [S850] after being passing through a compensation process [S842, S844]. The second signals are converted into a third signal [S870] corresponding to an actually transmitted signal in a manner that a function $f(t_1, H_l)$ related to a channel of an RE is additionally applied to the second signals [S862, S864, and S866]. In particular, in FIG. 8, the stage 1 [S880] indicates a step of utilizing a common precoder utilized by REs belonging to the RE group and the stage 2 [S890] indicates a step for each of the REs to utilize information on a unique channel of its own.

Meanwhile, in FIG. 8, N indicates the number of REs belonging to the RE group and a precoder indicates a ZF (zero forcing), an MMSE (minimum mean square error), a regularized ZF precoder, or specific terms constructing each precoder.

Each step is explained in detail in the following. In case of a regularized ZF scheme, a precoder of a reference RE belonging to an RE group is defined as Formula 3 in the following.

$$\tilde{P}_1 = H_1^\dagger (H_1 H_1^\dagger + \Gamma_1)^{-1} \quad \text{[Formula 3]}$$

Meanwhile, in FIG. 8, a common precoder $P_1$ shared in the RE group is represented by $P_1 = (H_1 H_1^\dagger + \Gamma_1)^{-1}$. The $P_1$ becomes a partial term of $\tilde{P}_1$ in Formula 3. In case of utilizing the ZF scheme, the common precoder $P_1$ can be represented as $P_1 = (H_1 H_1^\dagger)^{-1}$. On the contrary, in case of utilizing the MMSE scheme, the common precoder $P_1$ can be represented as $$P_1 = \left( H_1 H_1^\dagger + \frac{\sigma_w^2}{P} I \right)^{-1}.$$

In the MMSE scheme, $\sigma_w^2$ indicates noise variance and P indicates average power of a transmission symbol.

If the common precoder $P_1$ is determined, each of REs belonging to the RE group except the reference RE generates a first signal using the $P_1$. Subsequently, since a first signal of the reference RE corresponds to a signal generated by using unique channel information of the reference RE, it is not necessary to perform a compensation process for the first signal of the reference RE. In particular, the first signal of the reference RE can be utilized as a second signal. On the contrary, the first signals of the REs except the reference RE are generated using a common precoder instead of channel information of the REs. Hence, second signals are generated by passing through a compensation process for an error.

Subsequently, a compensation process in the stage 2 is explained in the following. A compensation process for REs is explained with an example of a second RE. A first signal $t_2^{(0)}$ is generated based on a channel $H_2$ of the second RE and a common precoder. A second signal of the second RE can be represented as Formula 4 based on the first signal.

$$t_2 = \min \| s_2 - (H_2 H_2^\dagger + \Gamma_2) t_2^{(0)} \|^2 \quad \text{[Formula 4]}$$

A compensation process according to the aforementioned Formula 4 can be performed by such various numerical analysis algorithms as a CG (conjugate gradient) algorithm, a Newton method algorithm, a steepest descent method algorithm and the like. Formula 5 in the following explains an embodiment of a compensation process performed by the CG algorithm.

$$\hat{x}^{(0)} = I_{N_s \times 1} \quad \text{[Formula 5]}$$
$$t = H_l H_l^\dagger \hat{x}^{(0)} + \Gamma_l \hat{x}^{(0)}$$
$$g^{(0)} = s_l - t$$
$$d^{(0)} = g^{(0)}$$
while
$$\| g^{(i)} \| > \delta \| g^{(0)} \| \text{ do}$$
$$t = (g^{(i)})^\dagger g^{(i)}$$
$$t = H_l H_l^\dagger d^{(i)} + \Gamma_l d^{(i)}$$
$$\alpha^{(i)} = \frac{t}{(d^{(i)})^\dagger t}$$
$$\hat{s}^{(i+1)} = \hat{s}^{(i)} + \alpha^{(i)} d^{(i)}$$
$$g^{(i+1)} = g^{(i)} - \alpha^{(i)} t$$
$$\beta^{(i+1)} = \frac{(g^{(i+1)})^\dagger g^{(i+1)}}{t}$$
$$d^{(i+1)} = g^{(i+1)} + \beta^{(i+1)} d^{(i)}$$
end while
$$x_l = \hat{x}^{(end)}$$

In Formula 5, $\hat{t}^{(i)}$ corresponds to a signal estimated on $i^{th}$ repetition of the CG algorithm. A signal estimated on $0^{th}$ repetition, i.e., an initial value $\hat{t}^{(0)}$ is configured by a first signal $t_l^{(0)} = P_1 s_l$. $\hat{g}^{(i)}$, $\hat{d}^{(i)}$, and $b^{(i)}$ indicate temporary vector in a compensation process. Meanwhile, the $\hat{g}^{(i)}$ vector corresponds to a gradient vector and indicates a fastest direction of which the repeatedly performed algorithm proceeds to a precise answer. In this case, if a difference between an updated $g^{(i)}$ vector and an initially generated $g^{(0)}$ is less than a specific threshold value, the repetition of the algorithm is stopped. In particular, an error size between a result of directly calculating $P_l$ and a second signal can be indirectly known via a size of the $\hat{g}^{(i)}$ vector. If a $g^{(i)}$ value corresponds to 0, the different between the second signal and the result obtained by using the $P_l$ becomes 0. $\delta$ determines an end point of the algorithm. As a size of the $\delta$ is smaller, the algorithm is more repeatedly performed but accuracy of a result is enhanced. On the contrary, as the size of the $\delta$ is bigger, the algorithm is less repeatedly performed but accuracy of a result is degraded. Meanwhile, if the number of repetition of the CG algorithm becomes identical to a size of a square matrix, an estimated solution (second signal) and a value actually obtained using the $P_l$ become completely identical to each other theoretically. In particular, the second signal $t_l = \hat{t}^{(N_s)}$ becomes identical to $P_l s_l$.

Meanwhile, it may set a limit on maximum time taken for generating a second signal in a manner of setting a limit on the number of repetition in a compensation process. In particular, if time taken for the MIMO transmitter algorithm proposed by the present invention to generate a second signal of a specific RE is very long, it may affect total processing time of a whole system. Hence, it is necessary to restrict the time taken for generating the second signal to be within a specific range. For instance, if a limit is set on the number of repetition of a compensation process, it may set a limit on the maximum time taken for generating the second signal generated by the proposed scheme. Yet, if compensation is not sufficiently performed within the limited number of repetition, since an error between the compensated second signal $t_l$ and a signal directly generated via channel information of the specific RE is big, performance can be degraded.

When the second signal is generated via the compensation process, REs generate a third signal by applying a function to which information of the REs is reflected to the second signal. For instance, a function $f(t_1,H_1)=H_1^\dagger t_1$ is applied to the second signal for a reference RE to generate a third signal $x_1$. Similarly, a function $f(H_2,t_2)=H_2^\dagger t_2$ is applied to a second RE to generate a third signal $x_2$. A precoding signal $x_l$ is generated for different REs belonging to the RE group by using a method similar to the method applied to the reference RE and the second RE.

In the foregoing description, embodiment of generating a second signal by passing through a compensation process on a first signal is explained. Unlike the aforementioned description, the compensation process can be omitted according to correlation between REs. In particular, when a first signal is detected by a common precoder from REs positioned in the vicinity of a reference RE, if channel correlation between the REs is greater than a prescribed threshold value, the compensation process is omitted and the first signal can be determined as a second signal.

In particular, a first signal $t_2^{(0)}$ for a second RE becomes a second signal $t_2$ after a compensation process is performed. If compensation is sufficiently performed, the $t_2$ becomes $P_2s_2$. In this case, if correlation between a reference RE and the second RE is greater than a threshold value, an error ($\|P_2s_2-t_2^{(0)}\|$) between the first signal $t_2^{(0)}$ and the $P_2s_2$ may be negligible although the compensation process is omitted. If it is expected that the error has little impact on performance degradation, the first signal can be directly determined as the second signal without performing compensation for the first signal.

Figure 9:
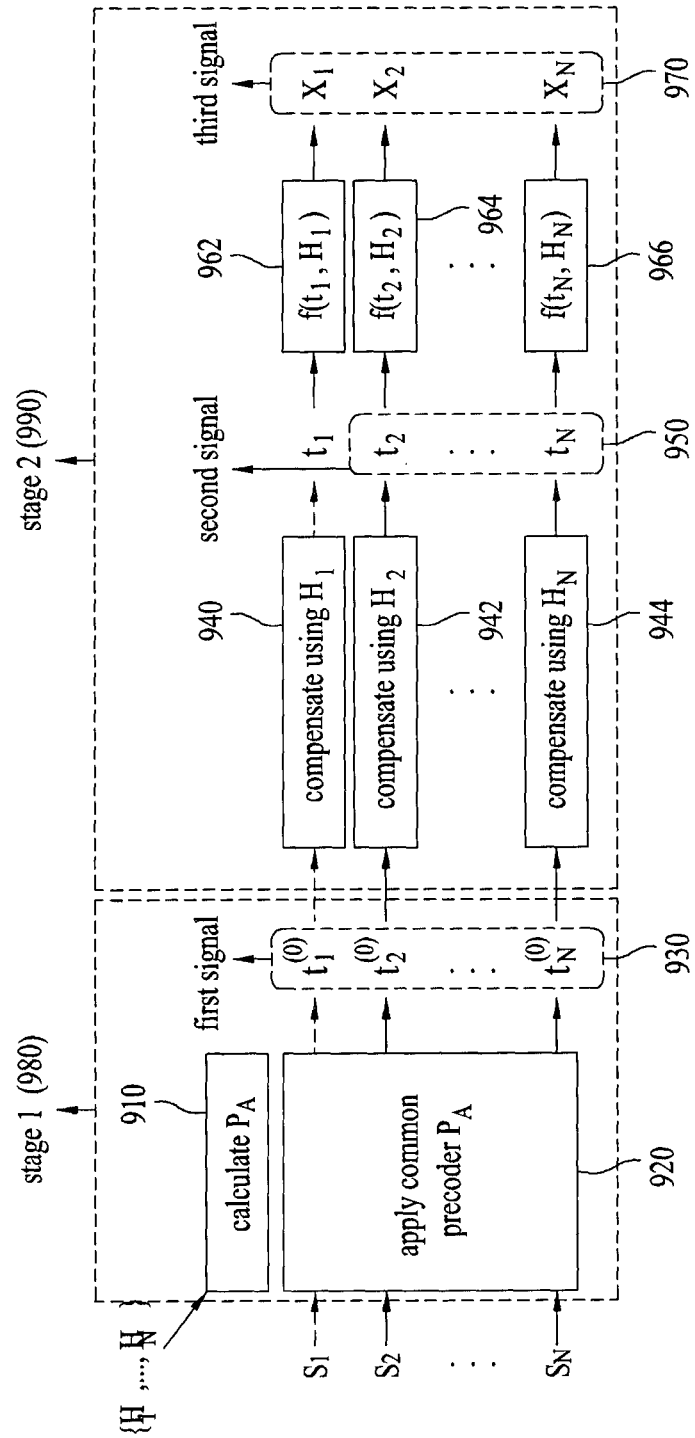
FIG. 9 is a flowchart for an operating process of a MIMO transmitter according to one embodiment of the present invention.

FIG. 9 is a flowchart for an operating process of a MIMO transmitter according to one embodiment of the present invention. In FIG. 9, embodiment of determining a common precoder using all channels within an RE group is explained.

In FIG. 9, a new channel matrix is defined based on channel information of all REs belonging to the RE group and the channel matrix can be represented as Formula 6 in the following.

$$H_A = \frac{1}{N}\sum_{l=1}^{N} w_l H_l \qquad \text{[Formula 6]}$$

In Formula 6, N indicates the number of REs belonging to the RE group. $w_l$ corresponds to a weighted value for each channel matrix. If the $w_l$ corresponds to 1, $H_A$ is defined by an average of all channel matrixes. A common precoder shared by all REs belonging to the RE group is defined as Formula 7 in the following based on the channel matrix.

$$B_A = (H_A^H H_A + \Gamma_A)^{-1} H_A^H \qquad \text{[Formula 7]}$$

In Formula 7, it may be defined as $$\Gamma_A = \frac{1}{N}\sum_{l=1}^{N} w'_l \Gamma_l$$

and $w'_l$ corresponds to a weighted value for each $\Gamma_l$.

In particular, according to the embodiment of FIG. 9, a common precoder $P_A$ is calculated based on channels of all REs [S910] and a first signal for all REs is generated using the common precoder [S920, S930]. Unlike FIG. 8, a first signal is generated for a first RE (i.e., reference RE) after being passing through the precoder in FIG. 21. Hence, for the first RE, a compensation process is performed on the first signal to generate a second signal [S940]. Other than that, the procedures mentioned earlier in FIG. 8 can be similarly applied to FIG. 9.

In the aforementioned FIG. 8 and FIG. 9, a method for a MIMO transmitter to generate a transmission signal for an RE group using a common precoder is explained. In the following FIG. 10 to FIG. 13, a method for a MIMO transmitter to generate a transmission signal by generating and utilizing a preprocessing filter in addition to the common precoder is explained.

Figure 10:
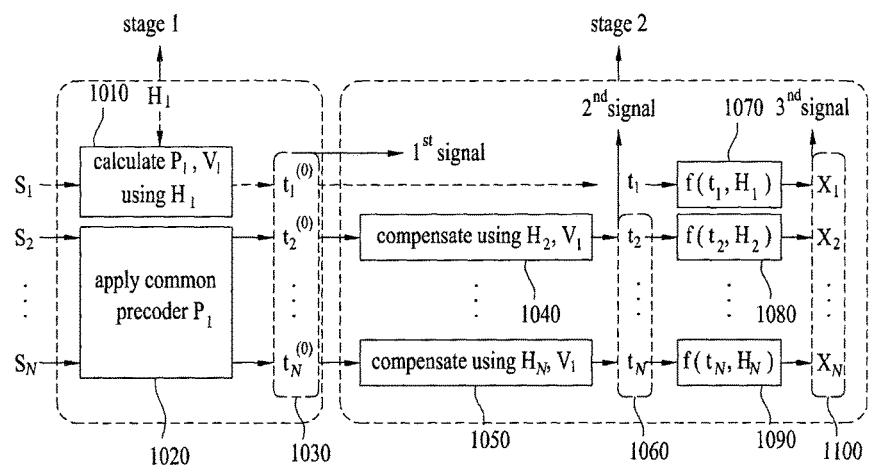
FIG. 10 is a flowchart for an operating process of a MIMO transmitter according to one embodiment of the present invention.

FIG. 10 is a flowchart for an operating process of a MIMO transmitter according to one embodiment of the present invention.

As mentioned earlier in FIG. 6, a MIMO transmitter according to one embodiment of the present invention configures a plurality of REs of which correlation between channels is relatively big as an RE group (having a size of N). The MIMO transmitter selects a reference RE from the RE group and generates a common precoder and a preprocessing filter based on a channel of the reference RE. The common precoder is used for generating a first signal of each RE in a manner of being shared by all REs belonging to the RE group and the preprocessing filter is used for generating a unique channel of each RE and a second signal, which is generated by performing compensation for the first signal. Subsequently, the second signal is converted into a final transmission signal, i.e., a third signal in a manner of applying a function to which channel information of each RE is reflected to the second signal.

In case of the MIMO transmitter mentioned earlier in FIG. 7, if the number of layers is big in the course of generating a transmission signal, such a complexity problem as shown in FIG. 1 occurs. In order to reduce the complexity, the MIMO transmitter proposed by the present invention uses a numerical analysis algorithm (e.g., CG (conjugate gradient)) instead of generating transmission signals of REs belonging to an RE group in a manner of directly calculating a transmission precoder.

In the following, $V_1$ indicates a 'preprocessing filter (or, acceleration filter)' which is generated based on a MIMO channel of a first RE belonging to an RE group. The aforementioned numerical analysis algorithm finds out a value by repeating a calculation process. A repeatedly calculated value is getting close to a precise answer. If the preprocessing filter $V_1$ is utilized in the repeatedly calculating process, the MIMO transmitter may generate a preferred transmission signal with less number of repetition only (i.e., promptly).

Yet, as mentioned in the foregoing description, generating a preprocessing filter to make speed of finding out a preferred value sufficiently fast also requires high complexity as well. Hence, in order to lower calculation complexity calculating each of preprocessing filters for all REs belonging to an RE group, a preprocessing filter is generated in a specific RE (e.g., the aforementioned first RE) and other REs belonging to the RE group may use the generated preprocessing filter by sharing it with each other. In particular, when the REs belonging to the RE group generate a transmission signal, the numerical analysis algorithm utilizes an identical preprocessing filter for all of the RE group. The aforementioned specific RE (or the first RE) can be defined as a 'reference RE'. The reference RE may indicate an RE simply becoming a reference for calculating a preprocessing filter. The reference RE is irrelevant to an order of an RE or an index of an RE in the RE group Hence, if channel correlation between REs in a group is big, the proposed MIMO transmitter generates [S1010] a preprocessing filter $V_1$ and a common precoder $P_1$ from a reference RE and generates a first signal by sharing the common precoder $P_1$ in the RE group [S1020, S1030]. A signal $t_l^{(0)}$ pre-coded in an $l^{th}$ RE using the common precoder $P_1$ becomes the first signal.

Subsequently, the MIMO transmitter applies the numerical analysis algorithm using the preprocessing filter $V_1$ to REs except the reference RE and generates a second signal $t_l$ [S1040, S1050, and S1060]. Regarding the reference RE, since the first signal is generated by the precoder using channel information of the reference RE, the first signal of the reference RE directly becomes a second signal. Subsequently, the MIMO transmitter applies a function $f(t_l, H_l)$ to which channel information of each RE belonging to the RE group is reflected to the second signal [S1070, S1080, and S1090] and generates a third signal corresponding to a final transmission signal [S1100].

In FIG. 10, a stage 1 indicates a process of generating a first signal using a common precoder $P_1$ and a stage 2 indicates a process of generating a transmission signal by processing the first signal using channel information of its own.

Formula 8 in the following explains an example of a numerical analysis algorithm which is performed in the course of performing compensation for a first signal. As mentioned in the foregoing description, such an algorithm as a CG algorithm, a Newton method algorithm, a steepest descent method algorithm and the like can be utilized as the numerical analysis algorithm. In Formula 8, an example of the CG algorithm is explained.

$$\hat{x}^{(0)} = I_{N_s \times 1}$$ [Formula 8]

or $$\hat{x}^{(0)} = P_1 s_l$$

$$t = H_l H_l^\dagger \hat{x}^{(0)} + \Gamma_l \hat{x}^{(0)}$$

$$g^{(0)} = s_l - t$$

$$d^{(0)} = V_1 g^{(0)}$$

while $$\|g^{(i)}\| > \delta \|g^{(0)}\| \text{ do}$$

$$t = (g^{(i)})^\dagger V_1 g^{(i)}$$

$$t = H_l H_l^\dagger d^{(i)} + \Gamma_l d^{(i)}$$

$$\alpha^{(i)} = \frac{t}{(d^{(i)})^\dagger t}$$

-continued $$\hat{s}^{(i+1)} = \hat{s}^{(i)} + \alpha^{(i)} d^{(i)}$$

$$g^{(i+1)} = g^{(i)} - \alpha^{(i)} t$$

$$\beta^{(i+1)} = \frac{(g^{(i+1)})^\dagger V_1 g^{(i+1)}}{t}$$

$$d^{(i+1)} = V_1 g^{(i+1)} + \beta^{(i+1)} d^{(i)}$$

end while $$x_l = \hat{x}^{(end)}$$

Compared to Formula 5, it is able to know that a preprocessing filter $V_1$ is added to the CG algorithm. In Formula 8, contents mentioned earlier in Formula 5 can be identically or similarly applied to other processes except the $V_1$.

Meanwhile, embodiment for a MIMO transmitter to generate a preprocessing filter $V_1$ is explained in detail in the following description.

According to a first embodiment, a preprocessing filter can be generated by various algorithms including a Jacobi scheme, a Gauss-Siedel scheme, an SQR preconditioning scheme, an incomplete Cholesky factorization scheme and the like.

First of all, a random matrix $A_1$ can be defined as Formula 9 in the following based on a MIMO channel of a reference RE (first RE).

$$A_1 = H_1 H_1^\dagger + \Gamma_1$$ [Formula 9]

In Formula 9, since the matrix $A_1$ corresponds to a positive definite matrix and has symmetry, the matrix can be disassembled as shown in Formula 10 in the following.

$$A_1 = L_1 + D_1 + L_1^H$$ [Formula 10]

In Formula 10, $L_1$ is a lower triangular matrix and $D_1$ is a diagonal matrix. In Formula 10, a preprocessing filter $V_1$ can be defined according to 3 types of algorithms among the aforementioned various algorithms.

Jacobi scheme: $V_1 = D_1^{-1}$
Gauss-Siedel scheme: $V_1 = (L_1 + D_1)^{-1}$
SQR preconditioning scheme: $V_1 = w(L_1 + wD_1)^{-1}$ (w corresponds to a random constant number)

Among the aforementioned schemes, the Gauss-Siedel scheme and the SQR preconditioning scheme can clearly represent the preprocessing filter $V_1$ by calculating an actual inverse matrix. Yet, in order to reduce calculation complexity of calculating the inverse matrix, the $V_1$ can be calculated via a back substitution process according to Formula 11 in the following instead of precisely calculating the $V_1$.

$$x = V^{-1} y \rightarrow Vx = y$$ [Formula 11]

In Formula 11, if V corresponds to a lower triangular matrix, x corresponding to a value of Formula 11 can be sequentially calculated from the right equation of Formula 11.

In addition to the aforementioned three schemes, in case of applying the incomplete Cholesky factorization scheme, the $A_1$ of Formula 10 can be disassembled to an incomplete Cholesky factor $\hat{L}_1$ shown in Formula 12 in the following. The $\hat{L}_1$ corresponds to a lower triangular matrix.

$$A_1 \approx \hat{L}_1 \hat{L}_1^H$$ [Formula 12]

Although the incomplete Cholesky factorization scheme can disassemble the $A_1$ with less complexity compared to the complete Cholesky factorization scheme, an approximated lower triangular matrix is defined. In case of the incomplete Cholesky factorization scheme, a preprocessing filter $V_1$ is defined as shown in Formula 13 in the following.

$$V_1 = (\hat{L}_1^H)^{-1} \hat{L}_1^{-1} \quad \text{[Formula 13]}$$

The preprocessing filter $V_1$ according to Formula 13 can be precisely represented by directly calculating an inverse matrix. Or, the preprocessing filter can be calculated and represented according to a back substitution process.

The preprocessing filter $V_1$ according to embodiment of the present invention can be calculated and defined according to various schemes except the aforementioned four schemes. For instance, various schemes and algorithms introduced to such literature as 'Iterative Methods for Sparse Linear Systems' can be utilized for a process of calculating the preprocessing filter $V_1$.

Meanwhile, in Formula 9, the $A_1$ is in an inverse matrix relation ($P_1 = A_1^{-1}$) with a common precoder $P_1$. A second embodiment of generating a preprocessing filter $V_1$ explains an embodiment of generating the preprocessing filter $V_1$ using the relation with the $P_1$. According to the second embodiment, a MIMO transmitter can define the preprocessing filter $V_1$ according to three methods in the following based on the $A_1$ matrix.

First of all, the preprocessing filter $V_1$ may use an inverse matrix of the common precoder $P_1$ as it is. In particular, the common precoder $P_1$ may directly become the preprocessing filter $V_1$. The present embodiment can be represented as Formula 14 in the following. If the common precoder $P_1$ is calculated, the MIMO transmitter uses the common precoder as the preprocessing filter. Since the common precoder and the preprocessing filter are identical to each other, it is not necessary for the MIMO transmitter to additionally calculate the $V_1$ and a memory required for calculating and storing the $V_1$ is not necessary.

$$V_1 = A_1^{-1} = P_1 \quad \text{[Formula 14]}$$

Secondly, the MIMO transmitter can calculate a preprocessing filter $V_1$ by dissembling $A_1$ according to the complete Cholesky factorization scheme. The aforementioned process is performed by passing through three steps according to an order shown in the following.

i) $A_1 = L_1 L_1^H$ ($L_1$ is a lower triangular matrix)
ii) $P_1 = (L_1^H)^{-1} L_1^{-1}$
iii) $V_1 = (L_1^H)^{-1} L_1^{-1}$, $\hat{L}_1 \approx L_1$ If a back substitution calculation process is used, a process of obtaining an inverse matrix of the lower triangular matrix $L_1$ can be omitted in the ii) step. In particular, in the second scheme, in case of applying the $P_1$ and the $V_1$, complexity can be reduced by utilizing the back substitution calculation process. In this case, main complexity occurs in the i) step among the total process of generating the preprocessing filter $V_1$ and the common precoder $P_1$.

Meanwhile, the iii) step corresponds to a step of generating a sparse preprocessing filter (a matrix of which most of elements of the matrix corresponds to 0) via an approximation process of $\hat{L}_1 \approx L_1$. If a preprocessing filter corresponds to a sparse filter, calculation complexity occurring in every repetition of a numerical analysis algorithm can be considerably reduced.

As a third method, the preprocessing filter $V_1$ can be calculated according to an incomplete Cholesky factorization scheme. The method is performed by passing through three steps according to an order shown in the following.

i) $A_1 \approx \hat{L}_1 \hat{L}_1^H$ ($\hat{L}_1$ is a lower triangular matrix)
ii) $P_1 = (\hat{L}_1^H)^{-1} \hat{L}_1^{-1}$
iii) $V_1 = (\hat{L}_1^H)^{-1} \hat{L}_1^{-1}$ In the second embodiment, main complexity of a process of generating the preprocessing filter $V_1$ and the common precoder $P_1$ occurs in the step i). Hence, $\hat{L}_1$ is calculated using the incomplete Cholesky factorization instead of the complete Cholesky factorization scheme in the step i) in the third embodiment.

In case of calculating the preprocessing filter $V_1$ and the common precoder $P_1$ based on the $\hat{L}_1$, unlike the second embodiment, a second signal should be calculated by passing through a compensation process for a reference RE as well. This is because, since the $P_1$ itself corresponds to an approximated inverse matrix, an error may also occur in the reference RE. Consequently, the third embodiment requires least complexity for generating the common precoder and the preprocessing filter among the three embodiments. Yet, the third embodiment may take largest repetition count in the compensation process.

The aforementioned embodiments are just examples. A preprocessing filter and a common precoder can be defined in various ways except the aforementioned methods.

As a third embodiment of generating a preprocessing filter, the preprocessing filter $V_1$ can be generated using characteristics of a MIMO channel of an RE. In order to calculate $A_1$ according to the aforementioned first embodiment, a process of calculating $(H_1 H_1^\dagger)$ 'matrix*matrix' is required. In order to enhance calculation complexity of the process, the third embodiment calculates the $A_1$ with less complexity by utilizing a MIMO channel of an RE.

Specifically, in a reference RE, $H_1 H_1^\dagger$ can be approximated to a diagonal matrix $Z_1$ in Formula 15 in the following.

$$Z_1 \triangleq \begin{bmatrix} h_1^T h_1^* & 0 & \cdots & 0 \\ 0 & h_2^T h_2^* & \ddots & \vdots \\ \vdots & \ddots & \ddots & 0 \\ 0 & \cdots & 0 & h_{N_r}^T h_{N_r}^* \end{bmatrix} \approx H_1 H_1^\dagger \quad \text{[Formula 15]}$$

$$H_1 = [h_1^T \quad h_2^T \quad \cdots \quad h_{N_r}^T]$$

An approximation process shown in Formula 15 becomes precise when the number of streams ($N_s$) is getting bigger and correlation between channel elements is getting smaller. The approximation process is performed on the basis that off-diagonal terms can be approximated to 0 according to channel characteristics in MIMO environment. According to the aforementioned approximation process, the matrix $A_1$ can be defined as a diagonal matrix shown in Formula 16 in the following.

$$A_1 = Z_1 + R \quad \text{[Formula 16]}$$

Subsequently, since the $A_1$ in Formula 10 can be represented by a diagonal term only, a preprocessing filter $V_1$ can be calculated by applying the Jacobi scheme mentioned earlier in first embodiment to the $A_1$ in Formula 16. In case of the third embodiment, if an error is big in the approximation process, an amount of reducing a repetition count of the numerical analysis algorithm may be not big enough. In particular, a speed of converging into a preferred answer may not be considerably increased.

Figure 11:
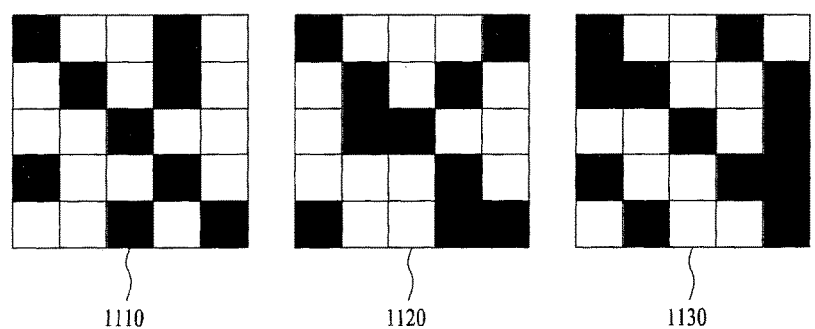
FIG. 11 is a diagram for an example of generating a preprocessing filter generated by a MIMO transmitter in accordance with the present invention.

In the aforementioned third embodiment, the embodiment of generating a preprocessing filter $V_1$ using MIMO channel characteristics of an RE has been explained. Meanwhile, there may exist a different embodiment of generating a preprocessing filter $V_1$ using MIMO channel characteristics of an RE. The embodiment is explained with reference to FIG. 11. FIG. 11 is a diagram for an example of generating a preprocessing filter generated by a MIMO transmitter in accordance with the present invention.

In embodiment of FIG. 11, it may find out $Z_1$ of which an error with the $H_1 H_1^\dagger$ is small and may be then able to utilize the method proposed by the first embodiment. For instance, if a MIMO channel matrix $H_1$ is approximated into a matrix $\tilde{H}_1$ in a form 1110/1120/1130 shown in FIG. 11, it may considerably reduce complexity for calculating $A_1$. In FIG. 11, a black component and a white component indicate a value of not 0 and a value of 0, respectively. In particular, a size of each component of a channel matrix is compared with a prescribed threshold and a channel size of a component smaller than the threshold is approximated into 0. In this case, a rank of the approximated $\tilde{H}_1$ should be identical to the $H_1$.

Figure 12:
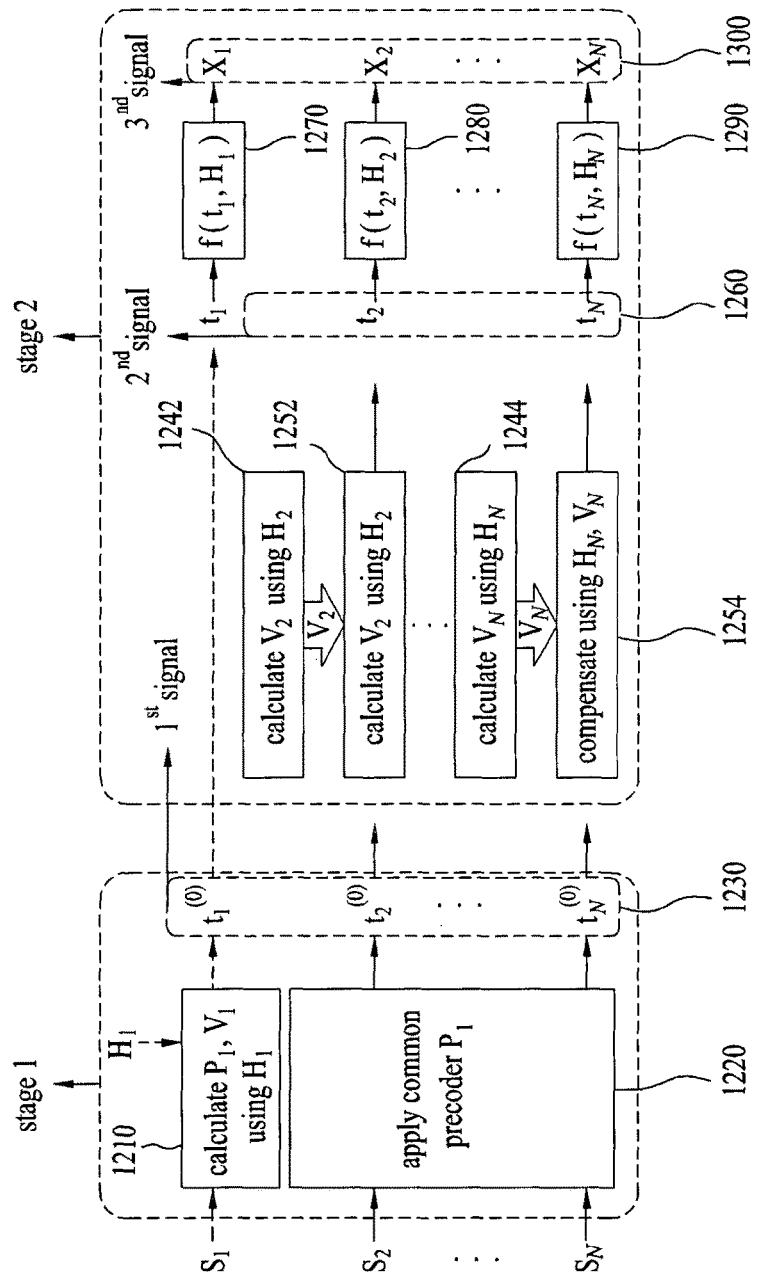
FIG. 12 is a flowchart for an operating process of a MIMO transmitter according to a different embodiment of the present invention.

FIG. 12 is a flowchart for an operating process of a MIMO transmitter according to a different embodiment of the present invention. In the foregoing description, various embodiments of generating a preprocessing filter $V_1$ and embodiment for a MIMO transmitter to generate a transmission signal by sharing the $V_1$ in an RE group are explained with reference to FIG. 10 and FIG. 11. On the contrary, an embodiment of generating a preprocessing filter according to an RE while the preprocessing filter is not shared in an RE group is explained in FIG. 12.

According to the embodiment of FIG. 12, a MIMO transmitter generates a common precoder $P_1$ and a preprocessing filter $V_1$ based on a channel of a reference RE [S1210]. The $P_1$ is utilized for generating a first signal in a manner of being shared by REs belonging to an RE group [S1220, S1230]. Prior to a compensation process for the first signal, the MIMO receiver generates a preprocessing filter based on a unique channel of each RE [S1242, S1244]. In particular, the MIMO transmitter calculates $V_2$ based on $H_2$ for a second RE and calculates $V_N$ based on $H_N$ for an $N^{th}$ RE [S1244].

The embodiments mentioned earlier in FIG. 10 and FIG. 11 can be applied to a process of generating a unique preprocessing filter for each RE. Subsequently, the MIMO receiver performs a compensation process based on a numerical analysis algorithm using the unique preprocessing filter which is generated for each RE [S1252, S1254]. A second signal, which is generated by passing through the compensation process [S1260], is converted into [S1300] a third signal corresponding to a final transmission signal by passing through a process of reflecting channel information of the second signal [S1270, S1280, and S1290].

According to embodiment of FIG. 12, since a preprocessing filter is generated for each RE, additional complexity is required. Yet, when channel correlation between REs is low, if embodiment of sharing a preprocessing filter is performed according to the scheme mentioned earlier in FIG. 10 and FIG. 11, the number of repetition of the compensation process increases. Hence, the embodiment of FIG. 12 utilizing a unique preprocessing filter is more efficient in reducing total complexity and time taken for calculating.

Moreover, in case of generating a preprocessing filter according to a Jacobi scheme, a Gauss-Siedel scheme, and an SQR preconditioning scheme under an assumption of a back substitution process, complexity increase occurring in the process of calculating the preprocessing filter can be minimized. Hence, it may not be a big burden on the MIMO transmitter. Meanwhile, when a lower triangular inverse matrix of N size is processed by the back substitution process, complexity is smaller than $N^2$.

Figure 13:
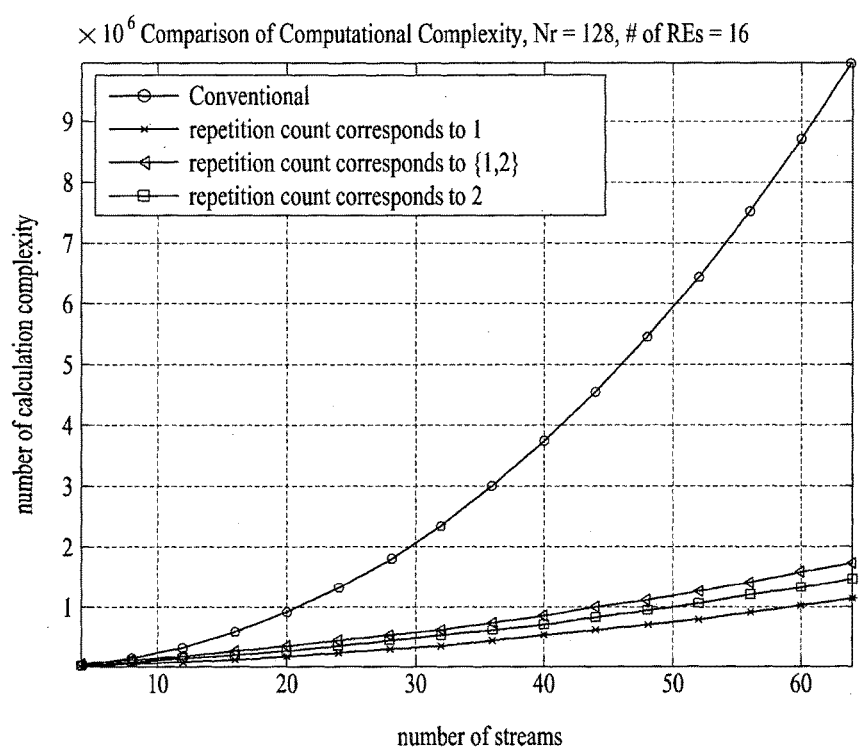
FIG. 13 is a graph for comparing a legacy technology and embodiments of the present invention with each other.

FIG. 13 is a graph for comparing a legacy technology and embodiments of the present invention with each other. FIG. 13 shows total required calculation complexity when REs are processed according to a legacy method and a method proposed by the present invention.

Referring to FIG. 13, a curve on which a circle is displayed in the graph indicates calculation complexity when a precoder is generated for all REs belonging to an RE group. Curves on which a star, a quadrangle and a triangle are respectively displayed in the graph indicate calculation complexity for a case that a common precoder and a preprocessing filter are generated and shared in an RE group including 16 REs.

The aforementioned three cases are different from each other in terms of the repetition count of a process of compensating a first signal with a second signal. If the repetition count corresponds to {1, 2}, the process is repeated one time for a half of the 16 REs and the process is repeated twice for another half of the 16 REs. From the embodiment shown in the drawing, it is able to know that a method of generating a transmission signal of the proposed MIMO transmitter is able to have more complexity gain as the number of transmission streams increases.

According to the embodiments mentioned in the foregoing description, if correlation between all REs belonging to an RE group corresponds to 1, a precise transmission signal can be generated although a common precoder $P_1$ is used only. In this case, since performance degradation does not occur although the $P_1$ is used only, calculation complexity is reduced to 1/N (N corresponds to the number of REs in the RE group).

If the correlation between REs belonging to the RE group is less than 1, an error of a first signal, which is estimated using a common precoder $P_1$, is compensated using a preprocessing filter $V_1$. As the correlation between REs is getting bigger, a compensation process of a numerical analysis algorithm using a preprocessing filter is performed more promptly (i.e., repetition count is reduced). In this case, although the compensation process to which the preprocessing filter is applied may have more increased calculation complexity compared to a compensation process to which the preprocessing filter is not applied, repetition count can be more sharply reduced compared to repetition count of the compensation process to which the preprocessing filter is not applied. Consequently, the MIMO transmitter proposed by the present invention can reduce complexity while minimizing performance degradation in a manner of maximally using the correlation between REs.

When calculation complexity is needed to be more reduced, the MIMO transmitter can more reduce the calculation complexity by taking performance degradation due to an error caused by the compensation process utilizing a preprocessing filter lying down. Hence, the MIMO transmitter can provide a trade-off between the calculation complexity and performance.

And, according to a proposed scheme, since an inverse matrix is not directly calculated for REs except a reference RE, all calculations are performed by calculation of 'matrix*vector'. It is difficult to perform distributed processing for inverse matrix calculation. On the contrary, since the calculation of 'matrix*vector' can be easily parallelized, it is able to easily apply a distributed processing scheme to the calculation of 'matrix*vector'. By doing so, total processing time can be sharply reduced.

3. Device Configuration

Figure 14:
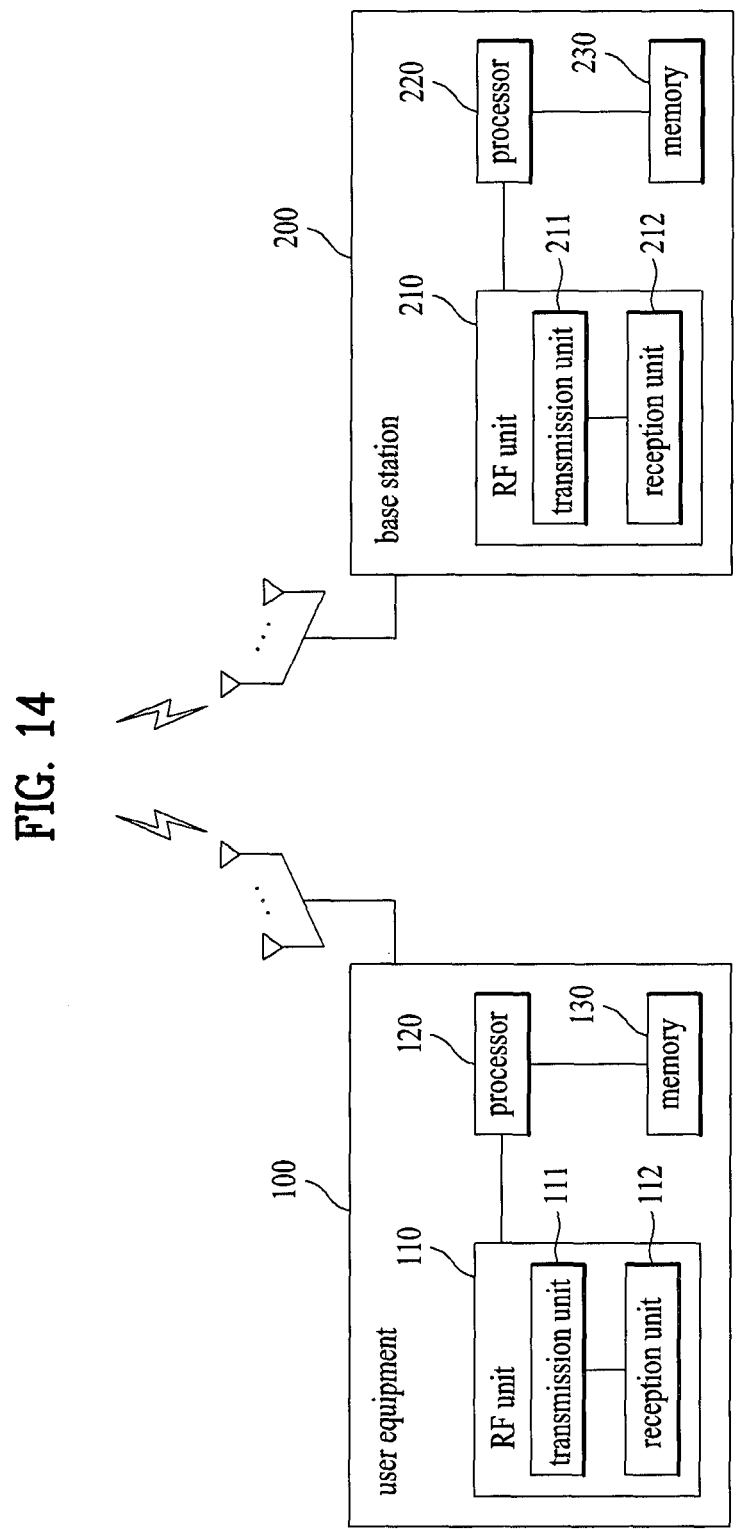
FIG. 14 is a block diagram for a user equipment and a base station in accordance with the present invention.

FIG. 14 is a block diagram for a user equipment and a base station in accordance with the present invention.

In FIG. 14, a user equipment 100 and a base station 200 can include a radio frequency (RF) unit 110/210, a processor 120/220 and a memory 130/230, respectively. Although FIG. 14 shows one-to-one communication environment between the user equipment 100 and the base station 200, communication environment can be constructed between a plurality of user equipment and the base station 200. And, the base station 200 depicted in FIG. 14 can be applied to both a macro cell base station and a small cell base station.

Each of the RF units 110/210 can include a transmission unit 111/211 and a reception unit 112/212, respectively. The transmission unit 111 and the reception unit 112 of the user equipment 100 are configured to transmit and receive a signal with the base station 200 and different user equipments. The processor 120 is functionally connected with the transmission unit 111 and the reception unit 112 and is configured to control the transmission unit 111 and the reception unit 112 to transmit and receive signal with different devices. And, the processor 120 performs various processing on a signal to be transmitted and transmits the signal to the transmission unit 111. The processor performs processing on a signal received by the reception unit 112.

If necessary, the processor 120 can store information included in an exchanged message in the memory 130. The user equipment 100 can perform the aforementioned various embodiments of the present invention with the above-mentioned structure.

The transmission unit 211 and the reception unit 212 of the base station 200 are configured to transmit and receive a signal with a different base station and user equipments. The processor 220 is functionally connected with the transmission unit 211 and the reception unit 212 and is configured to control the transmission unit 211 and the reception unit 211 to transmit and receive signal with different devices. And, the processor 220 performs various processing on a signal to be transmitted and transmits the signal to the transmission unit 211. The processor performs processing on a signal received by the reception unit 212. If necessary, the processor 220 can store information included in an exchanged message in the memory 230. The base station 200 can perform the aforementioned various embodiments of the present invention with the above-mentioned structure.

Each of the processors 120/220 of the user equipment 100 and the base station 200 indicates (e.g., control, adjust, manage) operations in the user equipment 100 and the base station 200. Each of the processors 120/220 can be connected with the memory 130/230 storing program codes and data. The memory 130/230 is connected with the processor 120/220 and stores an operating system, an application, and general files.

The processor 120/220 of the present invention can be named by such a terminology as a controller, a microcontroller, a microprocessor, a microcomputer and the like. Meanwhile, the processor can be implemented by hardware, firmware, software and a combination thereof. In the implementation by hardware, ASICs (application specific integrated circuits), DSPs (digital signal processors), DSPDs (digital signal processing devices), PLDs (programmable logic devices), FPGAs (field programmable gate arrays) and the like configured to perform the present invention can be installed in the processor 120/220.

Meanwhile, the aforementioned method can be written by a program executable in a computer and can be implemented by a general digital computer capable of operating the program using a computer readable medium. And, data structure used for the aforementioned method can be recorded in the computer readable medium in various means. Program storing devices usable for explaining a storing device including an executable computer code to perform various methods of the present invention should not be comprehended as temporary objects such as carrier waves and signals. The computer readable medium includes such a storing medium as a magnetic storing medium (e.g., a ROM, a floppy disk, a hard disk and the like) and an optical reading medium (e.g., a CD-ROM, a DVD and the like).

While the present invention has been described and illustrated herein with reference to the preferred embodiments thereof, it will be apparent to those skilled in the art that various modifications and variations can be made therein without departing from the spirit and scope of the invention. Thus, the disclosed methods should be considered in an explanatory viewpoint instead of a limitative viewpoint. The scope of the present invention is shown at not the detail description of the invention but the appended claims. Thus, it is intended that the present invention covers the modifications and variations of this invention that come within the scope of the appended claims and their equivalents.

The invention claimed is:

1. A method of transmitting transmission signals by a multiple input multiple output (MIMO) transmitter comprising a plurality of antennas, the method comprising:
   selecting a reference resource element (RE) from an RE group comprising a plurality of resource elements (REs);
   generating a common precoder and a preprocessing filter to be shared by the plurality of REs belonging to the RE group based on channel information of the reference RE;
   generating first signals for each of the plurality of REs based on the common precoder for transmission data of each of the plurality of REs;
   generating second signals for remaining REs based on a compensation process for first signals for the remaining REs,
   wherein the remaining REs are REs except the reference RE among the plurality of REs, and
   wherein the compensation process is performed to the first signals for the remaining REs based on channel information of each of the remaining REs and the preprocessing filter; and
   transmitting the transmission signals comprising the first signal for the reference RE and the second signals for the remaining REs.

2. The method of claim 1, wherein the preprocessing filter is a matrix used for enhancing accuracy of a process of generating the second signals by compensating the first signals for the remaining REs.

3. The method of claim 1, wherein the preprocessing filter is generated based on a Jacobi algorithm, a Gauss-Siedel algorithm, a Successive Over Relaxation (SOR) preconditioning algorithm, or an incomplete Cholesky factorization algorithm based on the channel information of the reference RE.

4. The method of claim 1, wherein the preprocessing filter is generated in a manner that a diagonal matrix is generated by approximating the channel information of the reference RE and a Jacobi algorithm is applied to the diagonal matrix.

5. The method of claim 1, wherein the second signals are generated by applying the preprocessing filter, the channel information of the REs and a conjugate gradient (CG) algorithm, a Newton method algorithm, or a steepest descent method algorithm together with the channel information of each RE to the first signals for the remaining REs.

6. The method of claim 5, wherein the second signals are generated by repeatedly performing the compensation process until an error between a result calculated using the channel information of each of the remaining REs and the first signals of each of the remaining REs becomes less than a threshold value, and
wherein a maximum number of repetitions of the compensation process is determined according to a MIMO channel environment or a user input.

7. The method of claim 1, wherein the transmission signals are generated by converting the first signal for the reference RE and the second signals for the remaining REs.

8. The method of claim 7, wherein the transmission signals are generated based on a function $f(t_n,H_n)=H_n^\dagger t_n$, where n=1, 2, ..., N, to which channel information of each of the plurality of REs is reflected, wherein $t_n$ of the function corresponds to the first signal corresponding to n=1 of the reference RE or the second signals corresponding to n=2, 3, ..., N of the remaining REs except the reference RE and wherein N indicates the number of REs belonging to the RE group.

9. The method of claim 1, wherein the common precoder is a part of a zero forcing (ZF) precoding matrix, a regularized ZF precoding matrix, or a minimum mean square error (MMSE) precoding matrix.

10. A MIMO (multiple input multiple output) transmitter containing a plurality of antennas and transmitting transmission signals, the MIMO transmitter comprising:
a transmitter;
a receiver; and
a processor operably coupled to the transmitter and the receiver and configured to:
select a reference resource element (RE) from an RE group comprising a plurality of resource elements (REs);
generate a common precoder and a preprocessing filter to be shared by the plurality of REs belonging to the RE group based on channel information of the reference RE;
generate first signals for each of the plurality of REs based on the common precoder for transmission data of each of the plurality of REs;
generate second signals for remaining REs based on a compensation process for first signals for the remaining REs,
wherein the remaining REs are REs except the reference RE among the plurality of REs, and
wherein the compensation process is performed to the first signals for the remaining REs based on channel information of each of the remaining REs and the preprocessing filter; and
transmit the transmission signals comprising the first signal for the reference RE and the second signals for the remaining REs.

11. The MIMO transmitter of claim 10, wherein the preprocessing filter is a matrix used for enhancing accuracy of a process of generating the second signals by compensating the first signals for the remaining REs.

12. The MIMO transmitter of claim 10, wherein the preprocessing filter is generated based on a Jacobi algorithm, a Gauss-Siedel algorithm, a Successive Over Relaxation (SOR) preconditioning algorithm, or an incomplete Cholesky factorization algorithm based on the channel information of the reference RE.

13. The MIMO transmitter of claim 10, wherein the preprocessing filter is generated in a manner that a diagonal matrix is generated by approximating the channel information of the reference RE and a Jacobi algorithm is applied to the diagonal matrix.

14. The MIMO transmitter of claim 10, wherein the second signals are generated by applying the preprocessing filter, the channel information of the REs and a conjugate gradient (CG) algorithm, a Newton method algorithm, or a steepest descent method algorithm together with the channel information of each RE to the first signals for the remaining REs.

15. The MIMO transmitter of claim 14, wherein the second signals are generated by repeatedly performing the compensation process until an error between a result calculated using the channel information of each of the remaining REs and the first signals of each of the remaining REs becomes less than a threshold value, and
wherein a maximum number of repetitions of the compensation process is determined according to a MIMO channel environment or a user input.

16. The MIMO transmitter of claim 10, wherein the transmission signals are generated by converting the first signal for the reference RE and the second signals for the remaining REs.

17. The MIMO transmitter of claim 16, wherein the third signals are generated based on a function $f(t_n,H_n)=H_n^\dagger t_n$, where n=1, 2, ..., N, to which channel information of each of the plurality of REs is reflected, wherein $t_n$ of the function corresponds to the first signal corresponding to n=1 of the reference RE or the second signals corresponding to n=2, 3, ..., N of the remaining REs except the reference RE and wherein N indicates the number of REs belonging to the RE group.

18. The MIMO transmitter of claim 10, wherein the common precoder corresponds to a part of a zero forcing (ZF) precoding matrix, a regularized ZF precoding matrix, or a minimum mean square error (MMSE) precoding matrix.

* * * * *